May 23, 1967 TOYOZO KAMBARA ET AL 3,321,371
NUCLEAR REACTOR WITH PIVOTAL REFLECTOR CONTROL ARRANGEMENT
Filed June 23, 1964
2 Sheets-Sheet 1

INVENTORS
Toyozo Kambara
Shoichi Terasawa
Kimio Arai
BY
Western & Western

United States Patent Office 3,321,371
Patented May 23, 1967

3,321,371
NUCLEAR REACTOR WITH PIVOTAL REFLECTOR CONTROL ARRANGEMENT
Toyozo Kambara, Mitaka-shi, and Shoichi Terasawa and Kimio Arai, Tokyo-to, Japan, assignors to Kabushiki Kaisha Hitachi Seisakusho, Tokyo-to, Japan, a joint-stock company of Japan
Filed June 23, 1964, Ser. No. 377,187
Claims priority, application Japan, June 24, 1963, 38/32,670
2 Claims. (Cl. 176—33)

This invention relates to a new thermal neutron reactor having a highly advantageous control system.

Heretofore, the generally practiced method of controlling thermal neutron reactors has depended on control rods which are controllably inserted into the reactor core, the neutron reaction being controlled by the magnitude of the resulting absorption of thermal neutrons. This method has had certain disadvantages as will be described more fully hereinafter.

It is a general object of the present invention to provide a new thermal neutron reactor wherein these disadvantages are avoided.

The nature, principle, and details of the invention, together with specific objects and advantages thereof, will be best understood by reference to the following description, taken in conjunction with the accompanying drawings in which like parts are designated by like reference characters, and in which.

Figure 9:
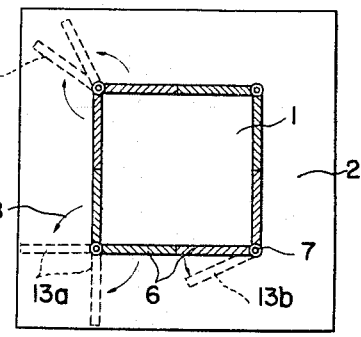
Figure 10A:
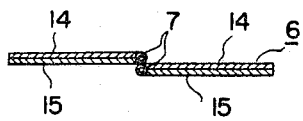
Figure 8:
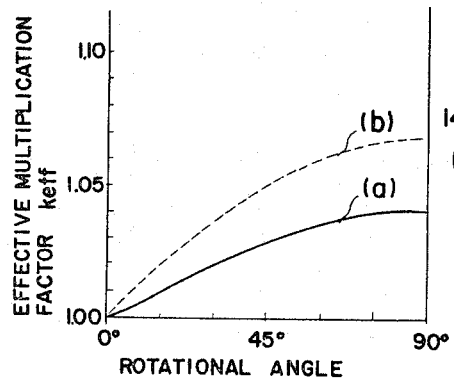
Figure 10B:
Figure 10C:
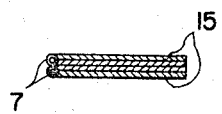

FIGS. 3 through 7, inclusive, are simplified views each indicating the essential arrangement and construction, in principle, of an embodiment of the thermal neutron reactor according to the invention;

FIG. 8 is a graphical representation indicating one example of relationships between control plate rotational angle and effective multiplication factor $k_{eff}$ of a thermal neutron reactor embodying the invention;

FIG. 9 is a simplified view indicating the essential arrangement and construction, in principle, of a further embodiment of the invention; and FIGS. 10(a), 10(b), and 10(c) are simplified views showing the essential construction of an example of a control plate suitable for use according to the invention.

Figure 1:
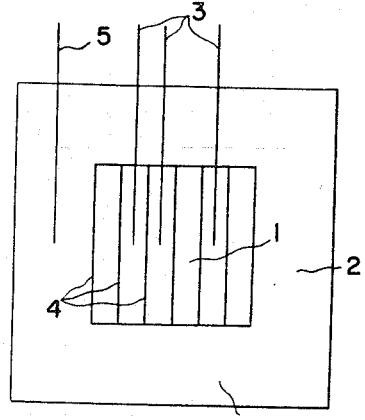
FIG. 1 is a simplified view, in section, showing the essential parts of a thermal reactor of known type.

Referring first to FIG. 1, a conventional thermal reactor is shown therein in a simplified manner as having a core 1, a reflector 2 surrounding the core 1, nuclear fuel elements 4 placed within the core 1, and control rods 3 inserted into the core. The control rods 3 are made of a material containing substances (such as, for example, boron and cadmium) which have high absorption cross section for thermal neutrons. As mentioned hereinbefore, these control rods are controllably inserted into the core 1, and the neutron reaction within the reactor is controlled by the magnitude of the absorption of the thermal neutrons.

Figure 2:
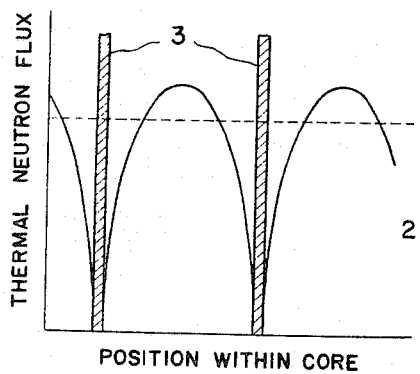
FIG. 2 is a graphical representation indicating one example of thermal neutron flux distribution in a reactor of the type illustrated in FIG. 1.

As indicated in FIG. 2, the thermal neutron flux in the vicinity of the inserted control rods 3 becomes abruptly low. Consequently, the neutron flux distribution within the core becomes distorted, and it is necessary to use a high thermal hot spot factor. Furthermore, in the case where devices such as control rod drive mechanisms and control rod guide tubes are arranged above and below the core in directions parallel to the fuel 4, such devices tend to interfere with fuel reloading or changing.

In another known type of reactor, absorption control rods 5 similar to the core control rods 3 are inserted into the neutron reflector 2, thereby to control the neutron reaction within the reactor. However, the reactivity which can be controlled by such an arrangement ordinarily is small.

The present invention contemplates avoiding such disadvantages of the conventional reactivity control method depending on control rods as described above.

More specifically, with consideration of the neutrons leaking from the core to the reflector, the invention contemplates the provision of a thermal neutron reactor wherein, by shifting control plates (or rods) made of or containing nuclear fertile material (for example, thorium-232, uranium-238, or plutonium-240) disposed within the reflector or between the core and reflector, or by varying the concentration of the fertile material contained in the control plate (or rod), the effect of the reflector is controlled, thereby to control the neutron chain reaction within the core.

It is to be observed that there is a distinct difference between the control method employed in the reactor of the present invention and that employed in a conventional fast reactor, wherein the reflector itself is made of fertile materials, and the reaction within the core is controlled by shifting this reflector. The present invention can be effectively and readily applied to thermal neutron reactors. Moreover, by the practice of the present invention, the nuclear fertile material constituting the reflector is not shifted, as in the conventional fast reactor, but the reflector and the control plates (or rods) made of nuclear fertile material exist separately. That is, by the present invention the control plates made of the fertile material which are inserted separately in the reflector or between the core and the reflector are shifted.

In other words, by the practice of this invention, a moderator (such as heavy water) of good neutron economy is used for the reflector, and control plates (or rods) for controlling the reactor, which plates (or rods) contain fertile material and are adapted to be shiftable in a simple manner within said reflector or between the core and the reflector, are used.

Figure 3:
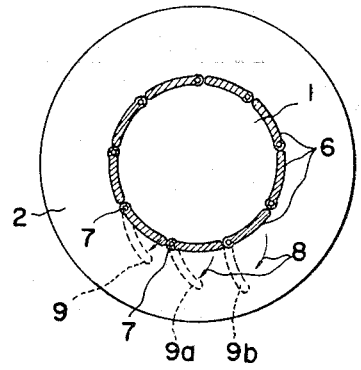

In the case where these control plates according to the invention completely surround the core, for example, as shown in FIG. 3, and, moreover, when they are substantially black bodies, a large part of the thermal neutrons leaking outward from the core are absorbed by these control plates. On the other hand, while the fast neutron leaking out from the core are not directly absorbed in large quantity, they are slowed down in the reflector and become thermal neutrons, which are reflected and, as they are returning into the core, are absorbed by the aforesaid control plates. Consequently, the reflector effect is remarkably reduced, and, as a result, the character of the reactor approaches that of a bare nuclear reactor.

On the one hand, when the control plates for the reflector are orientated in directions parallel to the direction of the neutron current leaking out from the core (ordinarily, in the radial direction of the core, but not necessarily so in all cases), or when the control plates are withdrawn, most of the neutrons leaking out from the core are not absorbed by the control plates but are directed toward the reflector, where they are reflected and return to the core. Accordingly, the number of neutrons so returning to the core is increased. Therefore, by varying the angles of the control plates and varying the lengths of their parts inserted into the reflector, thereby changing the effective surface area of the control plates surrounding the core, it is possible to control at will the reflector effect over a wide range.

Since the control operation according to this invention is not a direct operation, as in the conventional reactor where the control rods are inserted into core, there is no distortion of the neutron flux distribution within the reactor core. Furthermore, since these reflector control plates contain nuclear fertile material, the neutrons absorbed thereby serve to transform this fertile material into fissile material. Therefore, by removing the control plates at suitable periods and reprocessing them, it is also possible to extract fissile materials.

Since the control method of this invention is that whereby neutrons leaking out of the reactor core are controlled, increased control effect can be expected in a reactor in which the quantity of neutrons travelling from the core toward the reflector is large. Therefore, the higher the infinite multiplication factor $k_\infty$ is, and the smaller the size of the reactor, the higher is the reactivity which can be controlled.

Heretofore, it has been the ordinary practice to arrange the geometry of the conventional reactor is a manner such as to minimize the quantity of neutrons leaking out of the core. On the contrary, in the application of this invention, a reactor core of a shape producing a large leakage quantity (for example, a long, narrow core or a flat core) is preferably used, whereby the reflector effect can be varied over a wide range, and the range of reactivity which can be controlled can be widened. Although such a geometric design entails an increase in the critical mass, this increase is not a serious disadvantage when compared with the disadvantages, particularly the loss in neutron economy, of the conventional control method wherein a large number of control rods are inserted into the reactor core to suppress the initial excess reactivity, and then, as the burn up proceeds, the control rods are successively extracted.

For the reflector of the thermal neutron reactor of this invention, a material of high neutron reflection performance (for example, heavy water) is effective. Particularly in the case wherein the control method depends on the changing of the angle of the reflector control plates (or rods), the use of a liquid reflector is simple and convenient.

When the reflector is installed in two superposed layers, and a good reflector is used for the inner layer on the core side, effective results approaching those in the case where a single thick layer of a good reflector are obtained even when the said inner layer in relatively thin. Therefore, a construction wherein a good reflector is used for the inner layer of two layers, and the reflector control plates of this invention are inserted into the inner layer is both effective and economical.

Another point to be considered is that the effectiveness of a reflector depends greatly on its density. Therefore, it is also effective to use a complementary method wherein a separate reflector region is provided additionally on the inner side of the reflector control region of this invention, and the reflector effect is controlled by varying the density of the said separate reflector region, for example, by introducing voids or changing the temperature.

Furthermore, the effect of the control plates with respect to the reactivity can be selected to be either positive or negative by constructing the control plates of this invention of a combination of nuclear fertile materials and nuclear fissile (fissionable) materials and utilizing their respective self-shielding characteristic. The fertile material used for the reflector control plates may be a liquid, a gas, or a mixture thereof instead of a solid. Furthermore, the concentration or content of the nuclear fertile material in the reflector control plates can be selected from a wide range of values, and it is also possible to obtain control effect by causing this concentration or content to vary.

In order to indicate still more fully the nature of the invention, the following description with respect to preferred embodiments of the invention is set forth.

One embodiment of the invention as shown in FIG. 3 illustrates the case wherein a plurality of reflector control plates 6 made of nuclear fertile material are so disposed as to surround the periphery of the reactor core 1. In this case, most of the thermal neutrons leaking outward from the core 1 are absorbed by the control plates 6, and the reflection effect of the reflector 2 is greatly restricted, whereby the reactor assumes almost the state of a bare core.

However, when all of the control plates 6 or certain selected plates are rotated about their respective centers 7 of rotation in the direction indicated by arrows 8 to their respective positions such as 9, $9_a$, and $9_b$ as shown by dotted line, the reflection effect of the reflector 2 is progressively exhibited, and, consequently, the reactivity progressively increases. When all of the control plates 6 are in their respective positions $9_b$, the reflector effect is the maximum. Thus, by moving the control plates 6 within the reflector 2 and thereby changing their state of encirclement about the reactor core in this manner, it is possible to vary the reactivity of the reactor over a substantial range.

As will be apparent to those skilled in the art, the configuration of the reactor core and reflector, the shape, size, and number of the control plates, the positions of the rotational axes of the control plates, and other details of arrangement and construction of the reactor according to this invention are not limited to those indicated in the examples herein described and illustrated in FIG. 3 and other figures, various configurations and combinations of parts being possible for practically controlling the neutron flow from the core within the range of from full suppression to almost no suppression.

Figure 4:
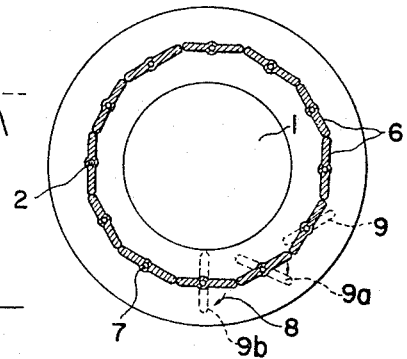

An example of arrangement and construction wherein the rotational axis of each control plate 6 is at or near the center of the plate is shown in FIG. 4. Although not shown, the control movement of each control plate need not be limited to only rotation, vertical and horizontal translational movements also being possible.

Figure 5:
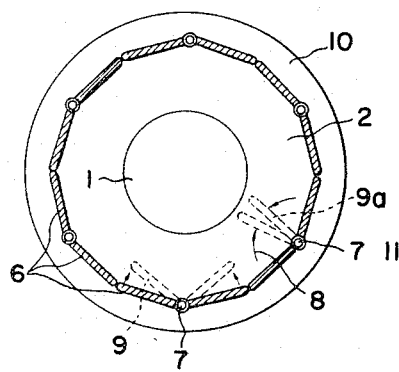

FIG. 5 illustrates an example of the case wherein, in order to increase the reflector effect, an additional outer reflector region 10 is provided outside of the reflector region 2 in which reflector control plates 6 are provided.

Figure 6:
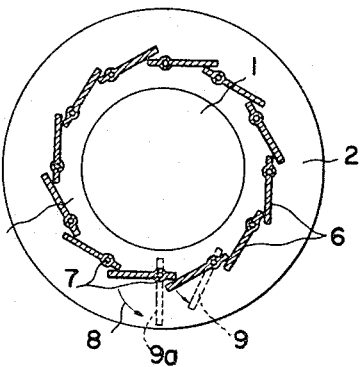

In the embodiment of the invention shown in FIG. 6, a reflector region 11 is provided on the inner side of a reflector region 2 in which control plates 6 are inserted, and the density of the inner reflector is caused to vary. For example, if this inner region is completely caused to have only voids, the control plates 6 will exhibit direct control effect, and if there are no voids, the control effect of the control plates 6 will be somewhat indirect because of the presence of the reflector 11 between the core 1 and the control plates 6.

Figure 7:
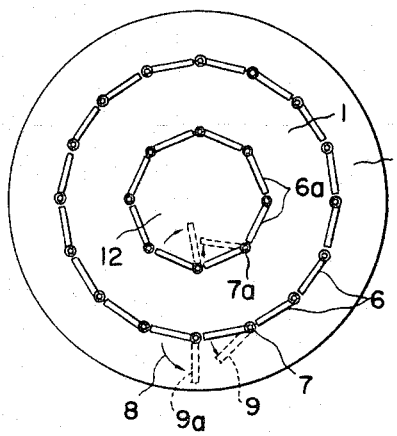

In another embodiment of the invention as shown in FIG. 7, a reflector region 12 is provided also on the inner side of the reactor core 1, reflector control plates 6 being placed within this region 12, and the reflection effect with respect to inwardly directed neutrons is also controlled, thereby to increase the control effect.

In one specific example of the invention, an enriched uranium, heavy water reactor with a core diameter of 83 cm. and height of 60 cm. was provided on the outer side of the core with a 43-cm. heavy water reflector layer and, on the outer side of this layer with a further 19-cm. light water reflector layer, and reflector control plates of thorium metal of 1-cm. thickness were placed in the heavy water reflector layer. The reactor was so adjusted as to be just critical when the control plates were in the state (rotational angle of zero degree) of complete encirclement of the core as indicated in FIG. 3. Relationships between the rotational angle and the reactivity (represented by the effective multiplication factor) when, in the above described reactor, the control plates are rotated about their respective axes are indicated in FIG. 8, curve (a) indicating the said relationship for the case of 18 control plates, and curve (b) indicating that for the case of 9 control plates. These curves indicate that the magnitude of the reactivity which can be controlled differs with the number of control plates used (the number of divisions of the core periphery).

In a further embodiment of the invention as shown in FIG. 9, the reactor core has a 75.5 x 75.5 cm. square section and a height of 60 cm. Reflector control plates of thorium metal of 1-cm. thickness are provided around the square core with their hinge axes 7 at the corners of the square core and are adapted to open about their respective hinge axes 7 to various angular positions as indicated by example positions 13, 13$_a$, and 13$_b$. As a result of computing by the two-dimensional diffusion code the value of the effective multiplication factor $k_{eff}$ for the case of total encirclement of the core by the control plates 6 and for the case when all plates 6 are in the outer diagonal positions 13, respective values of $k_{eff}$ of 0.96 and 1.10 were obtained. According to this result, it is possible to control the reactivity over a range of 14 percent by the rotational operation of the control plates 6.

One modification of the control plate suitable for use in the present invention is shown in FIG. 10. This example illustrates the case wherein, instead of using only a fertile material or a material in which a fertile material is mixed for the control plates, a combination of fertile materials and fissile materials is used for the control plates as mentioned hereinbefore so that the reactivity control effect can be used to be either positive or negative.

More specifically, each half of a control plate 6 is formed by superposing together a layer 14 made of a fertile substance and a layer 15 made of a fissile substance as shown in FIG. 10(a). When the two halves are folded and overlapped as shown in FIG. 10(b) to place their fertile material layers 14 on the outer surface, the control plate 6 in this state functions as a thermal neutron absorber. When the two halves are folded and overlapped to place their fissile material layers 15 on the outer surface as shown in FIG. 10(c), this control plate 6 functions contrarily as means (seed) for increasing the reactvity.

Thus, by using double layers of a fertile material and a fissionable material, instead of merely a layer of only a fertile material, for the control plates, it is possible to change the reactivity between positive and negative states. Control plates of the above described construction are particularly effective when used in an intermediate reflector region such as that shown in FIG. 6.

The thermal neutron reactor of the present invention having the above described control system possesses various advantages, of which the principal advantages are as set forth hereinbelow.

While, in a conventional nuclear reactor, the neutrons absorbed into the control rods, in almost all cases, are completely wasted, by the practice of the present invention, the neutrons absorbed into the control plates are utilized for transforming the fertile material constituting the control plates into fissile material, whereby the neutron economy is high. Furthermore, since there is no necessity of placing a large number of shim control rods in the reactor core, the construction and operation of the reactor becomes simple, and, moreover, since the flattening of the neutron flux distribution within the core can be kept, the reactor can be designed for a small hot spot factor, and the power density can be increased.

Still another advantage is that the absence of distortion in the neutron flux distribution within the core of this reactor eliminates the various inconveniences and difficulties accompanying conventional research reactors. A further advantage is that, since the control plates do not exist within the core, they do not interfere with work such as reloading or changing the fuel and installing and removing objects such as detectors and samples which must be placed in the core, whereby the time required for such work is greatly reduced, and freedom and facility of research work are greatly expanded.

It should be understood, of course, that the foregoing disclosure relates to only preferred embodiments of the invention and that it is intended to cover all changes and modifications of the example of the invention herein chosen for the purposes of the disclosure, which do not constitute departures from the spirit and scope of the invention as set forth in the appended claims.

We claim:
1. A thermal neutron reactor comprising a reactor core; a neutron reflector fixedly disposed about said core and in close proximity thereto; flat, elongated, pivoting control elements disposed within said reflector and forming a continuous ring therewithin thus enclosing a region formed by said core and a portion of said reflector; said control elements consisting essentially of neutron-absorbing fertile materials; and controlling means to vary the effective surface area of the control elements projectionally facing the core thereby to vary the effective absorption due to the control elements with respect to the neutron current leaking out from the core toward the reflector, and thereby varying the neutron reflection effect of the reflector, to accomplish control of the reactivity of the reactor; said control elements controlling the quantity of neutrons which are reflected back to said core by said reflector.

2. A thermal neutron reactor comprising a reactor core; a neutron reflector fixedly disposed about said core and in close proximity thereto; flat, elongated, pivoting control elements disposed within said reflector and forming a continuous ring therewithin thus enclosing a region formed by said core and a portion of said reflector; said control elements each having a front surface layer consisting essentially of a neutron-absorbing fissile material and a rear surface layer consisting essentially of a neutron-absorbing fertile material; and controlling means for selecting, from the front and rear surface layers of each of said control elements, one surface layer to face the core and for varying the effective surface area of one surface layer so selected projectionally facing the core, thereby accomplishing control of the reactivity of the core; said control elements controlling the quantity of neutrons which are reflected back to said core.

References Cited by the Examiner

UNITED STATES PATENTS

| | | | |
|---|---|---|---|
| 2,832,733 | 4/1958 | Szilard | 176—86 |
| 3,048,534 | 8/1962 | Tonks | 176—86 |
| 3,049,483 | 8/1962 | Kesselring | 176—86 |
| 3,149,048 | 9/1964 | Bevilacqua et al. | 176—86 |
| 3,151,032 | 9/1964 | Deutsch et al. | 176—86 |

FOREIGN PATENTS

| | | |
|---|---|---|
| 1,251,731 | 12/1960 | France. |
| 1,355,718 | 2/1964 | France. |
| 949,780 | 2/1964 | Great Britain. |

CARL D. QUARFORTH, *Primary Examiner.*

REUBEN EPSTEIN, *Examiner.*

H. E. BEHREND, *Assistant Examiner.*